(12) United States Patent
Beltowski

(10) Patent No.: US 7,455,616 B2
(45) Date of Patent: Nov. 25, 2008

(54) REMOVABLE THRUST WASHER RETAINER FOR A MOTORIZED WHEEL OFF-HIGHWAY DUMP TRUCK

(75) Inventor: Mark Frederick Beltowski, Erie, PA (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 11/070,902

(22) Filed: Mar. 2, 2005

(65) Prior Publication Data
US 2005/0250616 A1 Nov. 10, 2005

Related U.S. Application Data

(60) Provisional application No. 60/568,392, filed on May 5, 2004.

(51) Int. Cl.
*F16H 57/08* (2006.01)
(52) U.S. Cl. ..................................................... 475/331
(58) Field of Classification Search .................. 475/331
See application file for complete search history.

(56) References Cited

U.S. PATENT DOCUMENTS

| | | | | |
|---|---|---|---|---|
| 2,043,790 A | * | 6/1936 | Baker | 384/425 |
| 5,383,543 A | * | 1/1995 | Craft | 192/48.8 |
| 6,439,866 B1 | * | 8/2002 | Farkas et al. | 418/48 |
| 6,852,061 B2 | * | 2/2005 | Schoon | 475/348 |

* cited by examiner

*Primary Examiner*—Ha D. Ho
(74) *Attorney, Agent, or Firm*—Carlos Hanze; Steven M. McHugh

(57) ABSTRACT

A thrust washer retainer is provided and includes a first retainer portion, wherein the first retainer portion defines at least one first mating structure and includes a first interface structure, a second retainer portion, wherein the second retainer portion defines at least one second mating structure and includes a second interface structure, wherein the second retainer portion is disposed relative to the first retainer portion such that the first mating structure is associated with the second mating structure and a locking member having at least one locking structure, wherein the locking structure is associated with at least a portion of the first mating structure and the second mating structure such that the first retainer portion is non-movable relative to the second retainer portion.

6 Claims, 9 Drawing Sheets

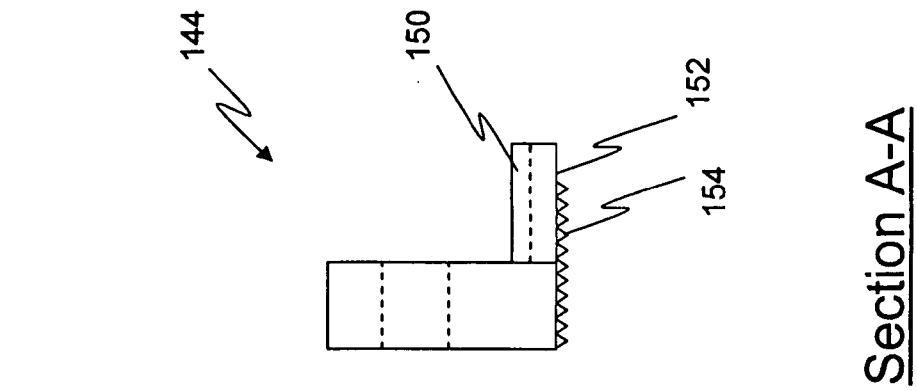
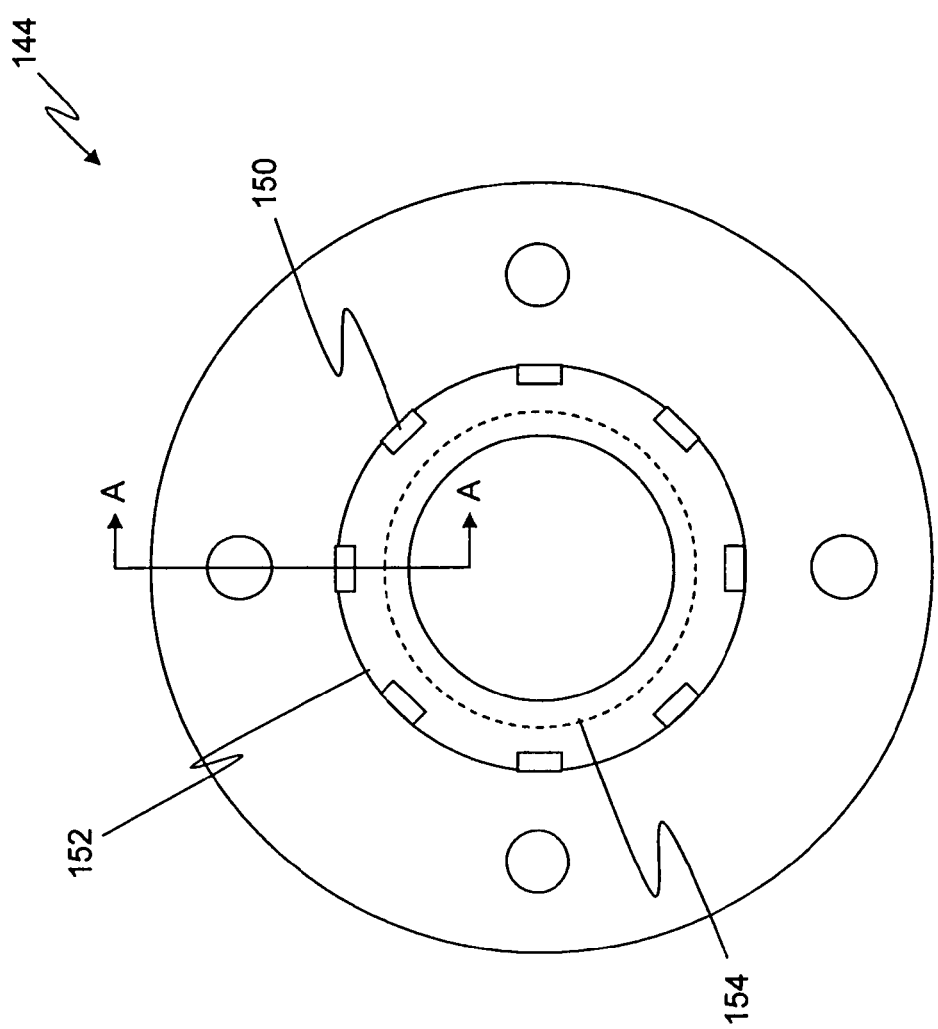

Section B-B

Section C-C

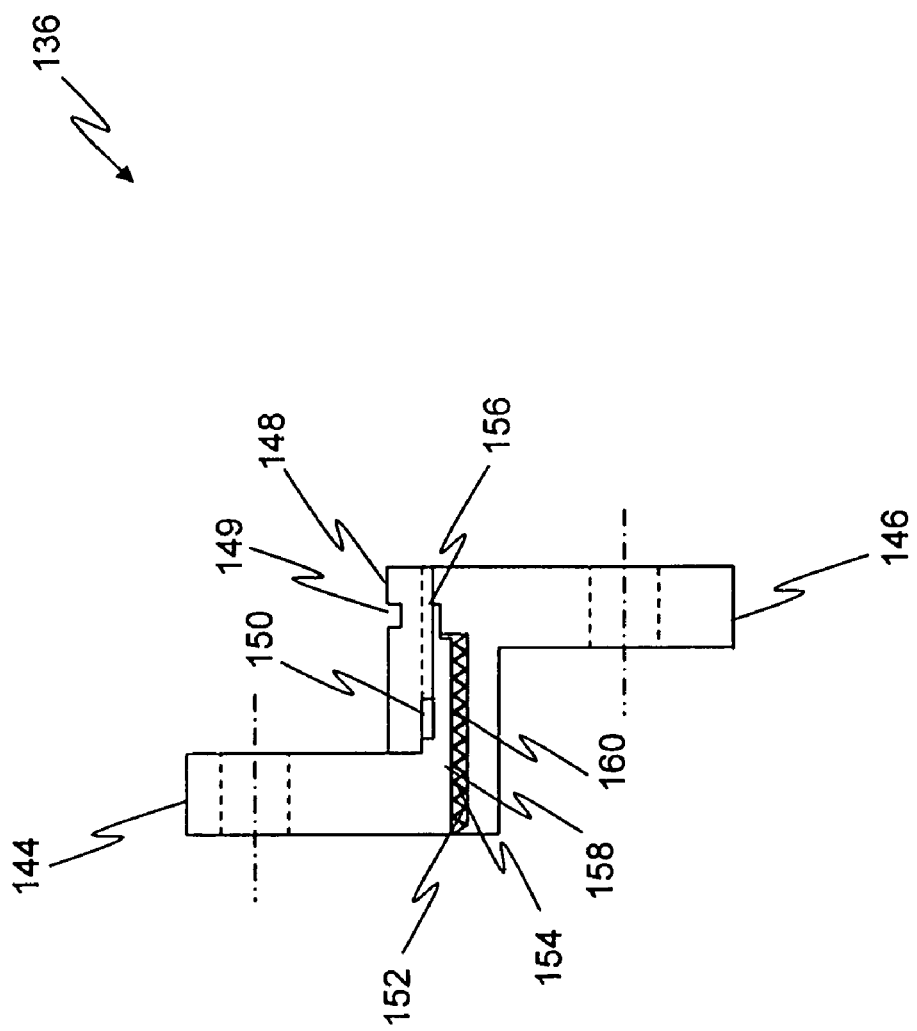

REMOVABLE THRUST WASHER RETAINER FOR A MOTORIZED WHEEL OFF-HIGHWAY DUMP TRUCK

RELATED APPLICATIONS

The present application claims priority of U.S. Provisional Patent Application Ser. No. 60/568,392 filed May 5, 2004, the contents of which are incorporated herein by reference in its entirety.

FIELD OF THE INVENTION

The present invention relates generally to a transmission for a mining truck and more particularly to a device that allows for easy access to a transmission inboard thrust washer.

BACKGROUND OF THE INVENTION

Large off-road, heavy-duty work vehicles, such as mining vehicles used to haul heavy payloads excavated from open pit mines, are well known and usually employ motorized wheels for propelling or retarding the vehicle in an energy efficient manner. This type of vehicle is shown in FIG. 1. This efficiency is typically accomplished by employing a large horse-power diesel engine in conjunction with an alternator and a main traction inverter. The diesel engine is directly associated with the alternator such that the diesel engine drives the alternator. The alternator is used to power the main traction inverter, wherein the main traction inverter supplies power having a controlled voltage and frequency to two drive motors disposed within the rear wheels of the vehicle. As the drive motor is operated, the drive motor causes a transmission drive shaft to rotate at a low torque and high speed about the drive shaft axis. Because the transmission drive shaft is directly associated with the vehicle transmission, the low torque high speed rotational energy of the transmission drive shaft is communicated to the vehicle transmission. The vehicle transmission then takes the low torque high speed rotational energy supplied by the transmission drive shaft and converts this energy into a high torque low speed rotational energy output which is supplied to the rear wheels.

Referring to FIG. 2, the conversion of this low torque high speed rotational energy into a high torque low speed rotational energy is typically accomplished using a double reduction gear set disposed within the vehicle transmission. A double reduction gear set is a series of gears, pinions and planets that includes a first reduction stage and a second reduction stage. The first reduction stage may include a high-speed sun pinion, a plurality of high-speed planets and a stationary ring gear and the second reduction stage may include a low-speed sun pinion, a plurality of low-speed planets and a stationary ring gear. The output of the first reduction stage is connected to the input of the second reduction stage and may be referred to as the high-speed carrier. In a similar manner, the output of the second reduction stage is connected to the vehicle wheels via a torque tube/hub assembly.

A transmission of the type described above includes a plurality of moving parts that interact and mesh with each other in order to convert the low torque high-speed energy into high torque low-speed energy. As such, it is essential to keep all of the parts of the transmission in good working order to avoid a catastrophic equipment failure. However, several problems currently exist with this type of transmission that make the maintenance and/or repair of these components labor intensive and very expensive. One of these problems involves the inboard thrust washer, which is disposed within the transmission and is used to restrain the axial motion of the high-speed carrier. Unfortunately, current transmission designs do not allow for the easy access and removal of the inboard thrust washer. In fact, current configurations require a complete disassembly of the wheel to remove the inboard thrust washer. This is undesirable because these vehicles are extremely large and heavy requiring considerable cost and labor to replace this component. This is also undesirable because of the down time or opportunity cost due to the loss of use of the vehicle while undergoing repairs and/or maintenance. Every minute that these vehicles are not operating results in lost earnings for the operators of these vehicles, and thus can result in the loss of thousands of dollars for every hour the vehicle is inactive.

SUMMARY OF THE INVENTION

A removable thrust washer retainer for an off-highway vehicle having an electric propulsion system which includes a plurality of motorized wheels, a traction motor for delivering power to a respective wheel, a transmission in the wheel for transmitting power from the motor to the wheel, wherein the transmission comprises a central drive shaft, a planetary gear train at the end of the central drive shaft, and a thrust washer enabling relative rotation of the central drive shaft and the wheel, and a cover over an opening in an outer end of the wheel for access to the thrust washer is provided, wherein the removable thrust washer includes a first thrust washer retainer portion, wherein the first thrust washer retainer portion is of generally annular configuration and defines a bearing surface engageable with a thrust washer at the end of a drive shaft of an electric propulsion system, at least one first mating structure and a first interface structure, wherein the first thrust washer retainer portion is accessible at the outer end of a wheel via an opening therein. A second thrust washer retainer portion is also provided, wherein the second thrust washer retainer portion is of generally annular configuration and defines a second mating structure surrounding and engageable with the first mating structure of the first thrust washer retainer portion for detachably connecting the first thrust washer retainer portion and second thrust washer retainer portions against relative axial movement when connected, wherein the second thrust washer retainer portion is secured in the wheel against removal without removal of the wheel from the truck, and further includes a second interface structure. Additionally, a locking member is provided, wherein the locking member is of generally annular configuration accessible via the opening at the outer end of the wheel and surrounding the first mating structure and the second mating structure of the first thrust washer retainer portion and the second thrust washer retainer portion and having at least one locking structure engageable with the first interface structure and the second interface structure of the first thrust washer retainer portion and the second thrust washer retainer portion for selectively securing the first thrust washer retainer portion and the second thrust washer retainer portion against relative annular motion, whereby with the cover removed the locking member may be detached from the first thrust washer retainer portion and the second thrust washer retainer portion and the first thrust washer retainer portion and the second thrust washer retainer portion may be detached from each other so as to enable removal and replacement of the first thrust washer retainer portion from the opening in the wheel.

A transmission assembly is provided and includes a hub assembly, wherein the hub assembly includes a sun pinion cover and defines a hub assembly cavity and a transmission opening, wherein the transmission opening is communicated with the hub assembly cavity. A reduction gear set is also provided, wherein the reduction gear set includes an inboard thrust washer and a thrust washer retainer, the thrust washer retainer including, a first retainer portion, wherein the first retainer portion defines at least one first mating structure and includes a first interface structure, a second retainer portion, wherein the second retainer portion defines at least one second mating structure and includes a second interface structure, wherein the second retainer portion is disposed relative to the first retainer portion such that the first mating structure is associated with the second mating structure and a locking member having at least one locking structure, wherein the locking structure is associated with at least a portion of the first mating structure and the second mating structure such that the first retainer portion is non-movable relative to the second retainer portion.

A thrust washer retainer is also provided, wherein the thrust washer retainer includes a first retainer portion, wherein the first retainer portion defines at least one first mating structure and includes a first interface structure, a second retainer portion, wherein the second retainer portion defines at least one second mating structure and includes a second interface structure, wherein the second retainer portion is disposed relative to the first retainer portion such that the first mating structure is associated with the second mating structure and a locking member having at least one locking structure, wherein the locking structure is associated with at least a portion of the first mating structure and the second mating structure such that the first retainer portion is non-movable relative to the second retainer portion.

BRIEF DESCRIPTION OF THE DRAWING FIGURES

The foregoing and other features and advantages of the present invention will be more fully understood from the following detailed description of illustrative embodiments, taken in conjunction with the accompanying drawings in which like elements are numbered alike in the several Figures:

FIG. 5 is front view of a first retainer portion of the thrust washer retainer of FIG. 3;

FIG. 6 is a side sectional view of a first retainer portion of the thrust washer retainer of FIG. 3;

FIG. 12 is a side sectional view of the thrust washer retainer of FIG. 3 showing the first thrust washer retainer portion, the second thrust washer retainer portion and the locking member.

DETAILED DESCRIPTION OF THE INVENTION

Figure 1:
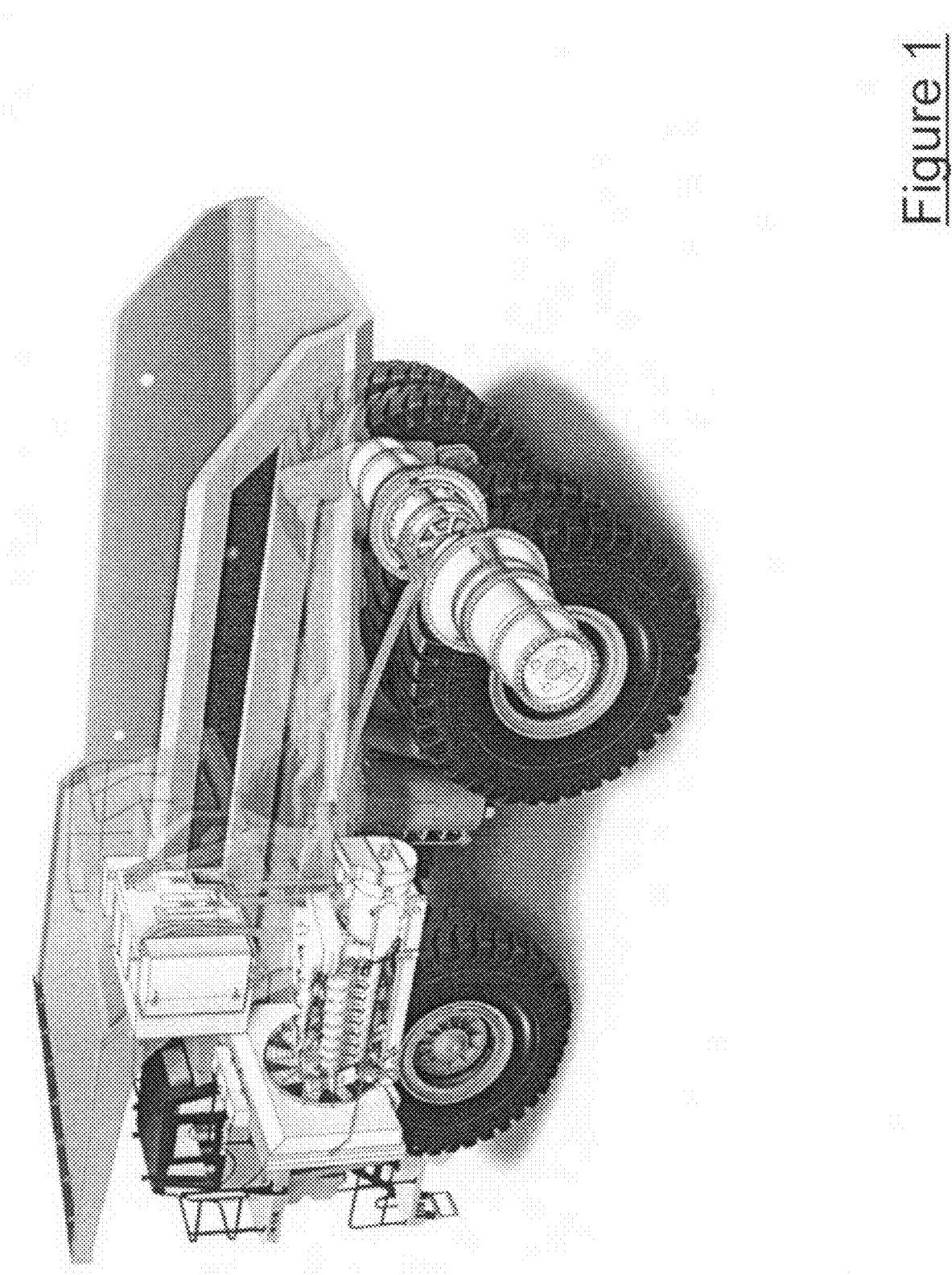
FIG. 1 is a side perspective view of an off-road, heavy-duty work vehicle of the type that uses a transmission.
Figure 2:
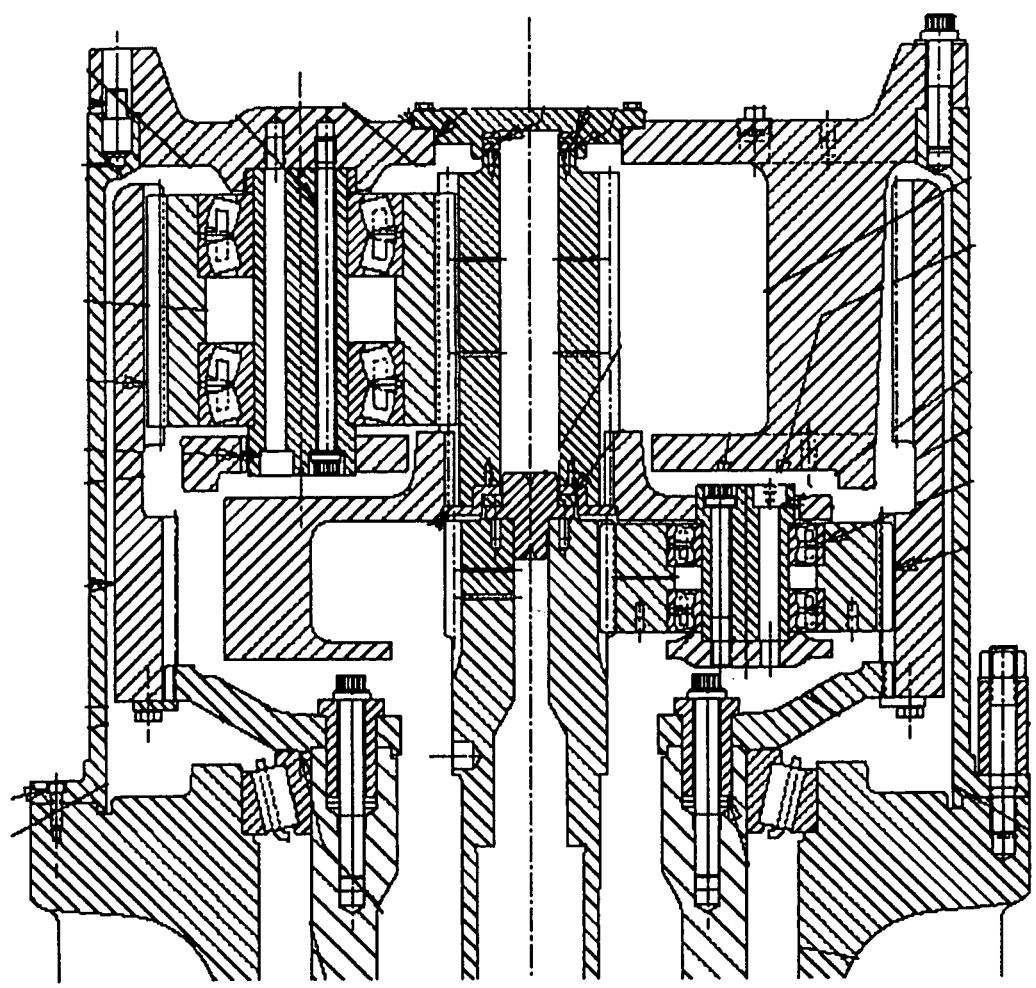
FIG. 2 is a cross sectional side view of a transmission having a thrust washer retainer, in accordance with the prior art.
Figure 3:
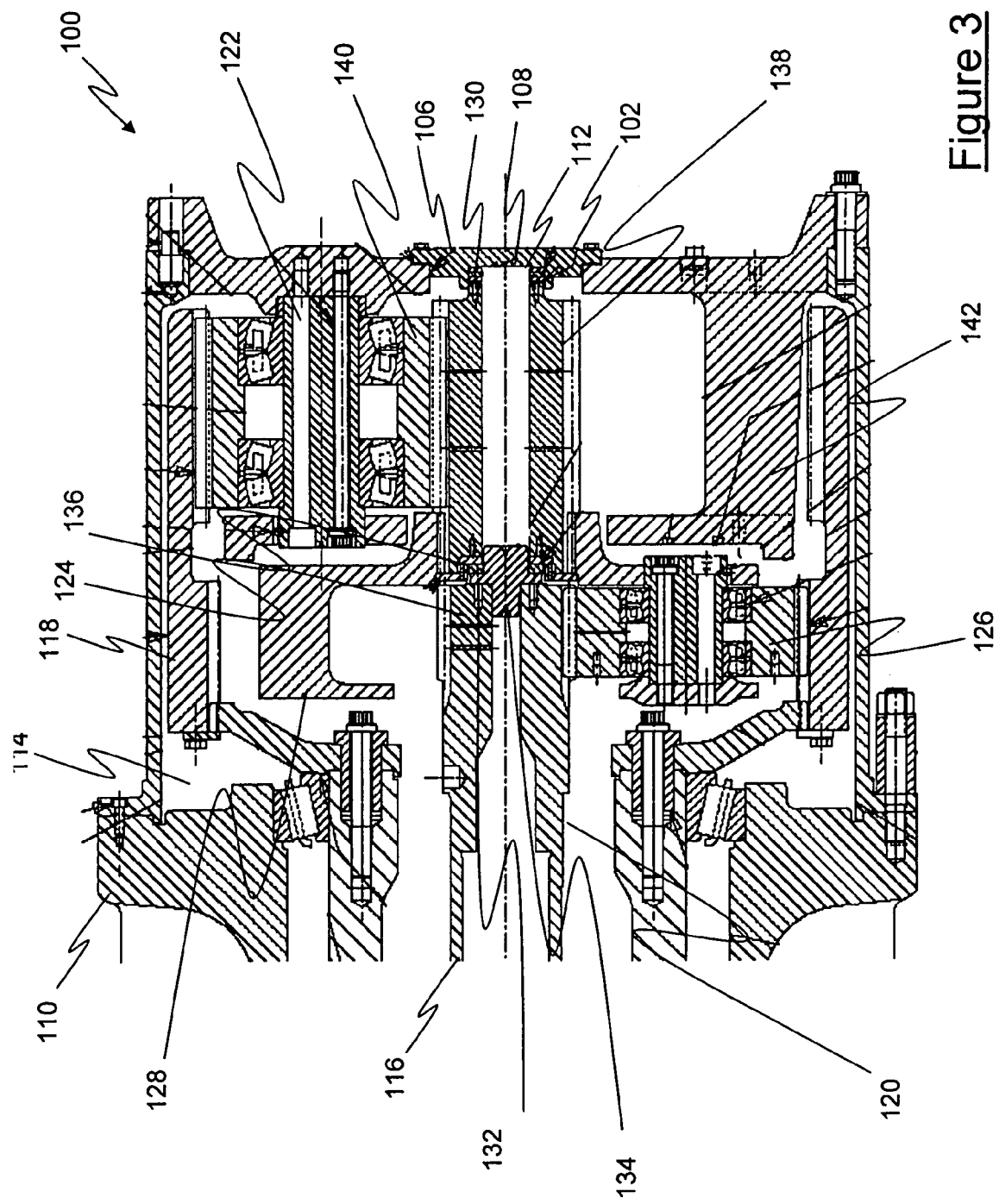
FIG. 3 is a cross sectional side view of a transmission having a thrust washer retainer, in accordance with an exemplary embodiment.

Referring to FIG. 3, a transmission 100 is illustrated and includes a sun pinion cover 102. Sun pinion cover 102 includes a cover body structure 104 having a cover outer surface 106 and a cover inner surface 108, wherein sun pinion cover 102 is non-movably associated with transmission 100. Transmission 100 also includes a hub assembly 110, which defines a transmission opening 112 and a hub assembly cavity 114, wherein transmission opening 112 is communicated with hub assembly cavity 114. Transmission 100 also includes a double reduction gear set 116 disposed within hub assembly cavity 114, wherein double reduction gear set 116 includes a stationary ring gear 118, a first reduction stage 120 and a second reduction stage 122.

First reduction stage 120 includes a high-speed sun pinion 124, a plurality of high-speed planets 126 and a high-speed carrier 128, wherein high-speed carrier 128 transmits the output of first reduction stage 120 to second reduction stage 122. High-speed carrier 128 is disposed within transmission 100 such that its axial motion is restrained by an outboard thrust washer 130 riding on the cover inner surface 108 and an inboard thrust washer 132 riding on a plug 134, wherein inboard thrust washer 132 is non-movably associated with plug 134 via a thrust washer retainer 136. Second reduction stage 122 includes a low-speed sun pinion 138, a plurality of low-speed planets 140 and a low-speed carrier 142, wherein low-speed sun pinion 138 is the input to second reduction stage 122 and receives the output of first reduction stage 120 from high-speed carrier 128. Low-speed carrier 142 receives the output of second reduction stage 122 and transmits this high torque output to the vehicle wheels via a drive shaft, wherein the relative rotation of the drive shaft is transferred to the wheel.

Figure 4:
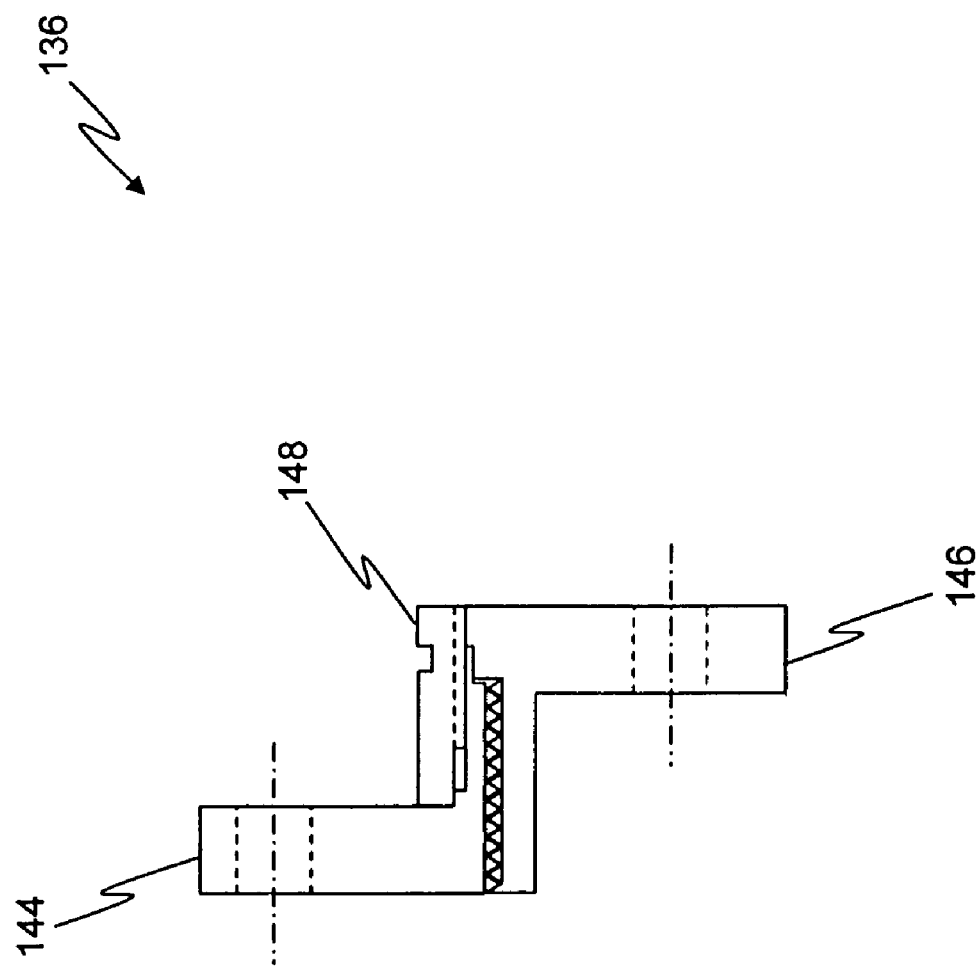
FIG. 4 is a side sectional view of the thrust washer retainer of FIG. 3.
Figure 8:
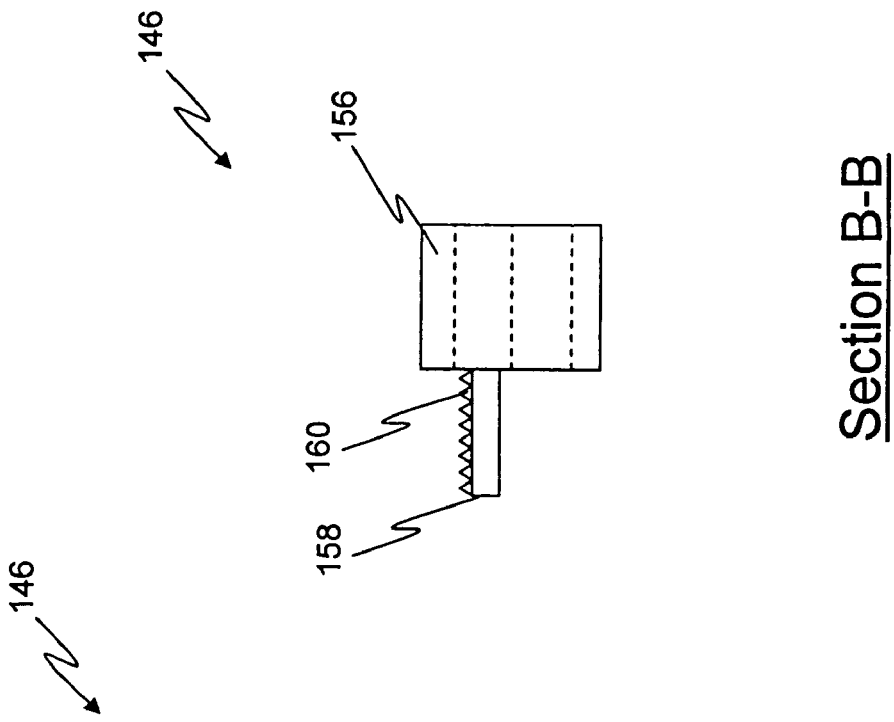
FIG. 8 is a side sectional view of a second retainer portion of the thrust washer retainer of FIG. 3.
Figure 7:
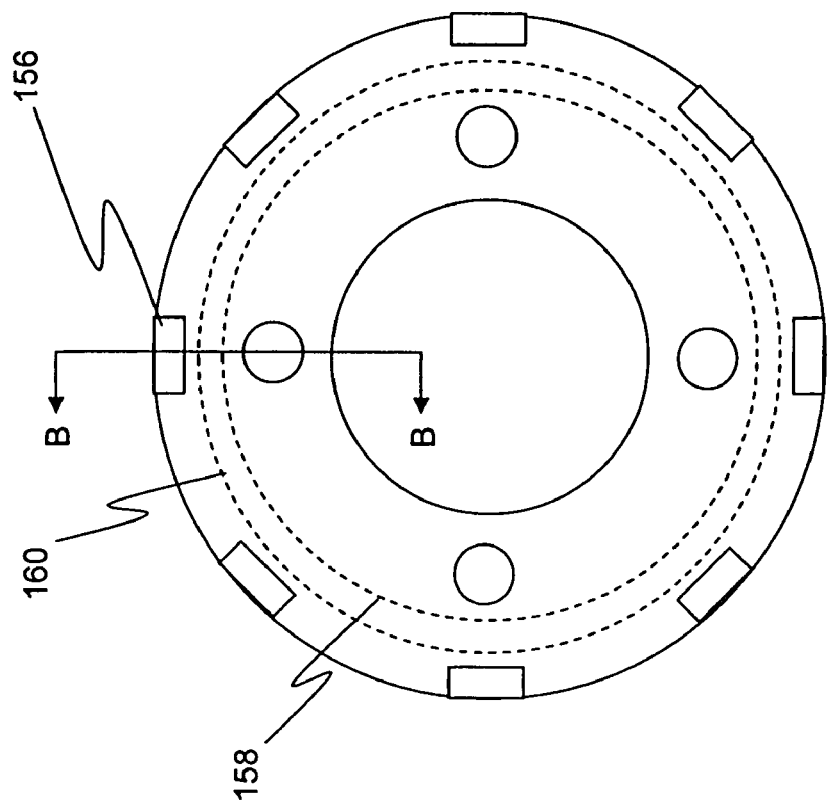
FIG. 7 is front view of a second retainer portion of the thrust washer retainer of FIG. 3.
Figure 10:
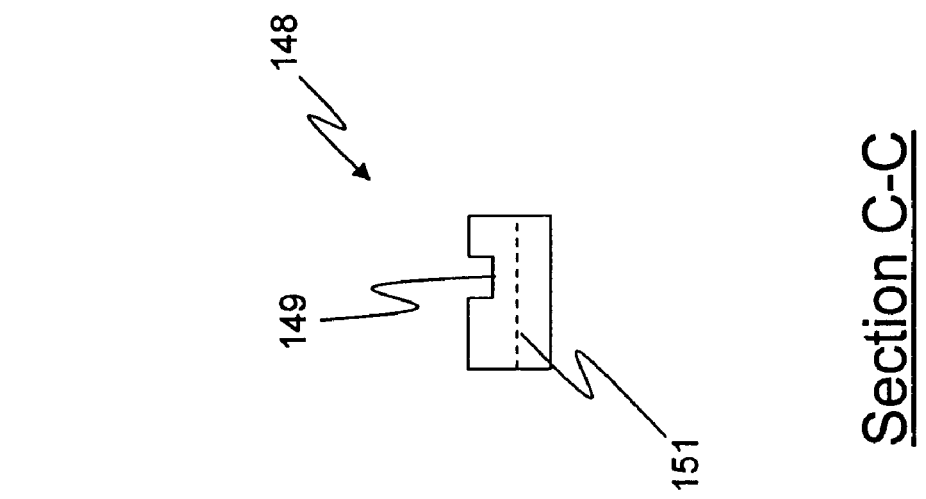
FIG. 10 is a side sectional view of a locking member of the thrust washer retainer of FIG. 3.
Figure 9:
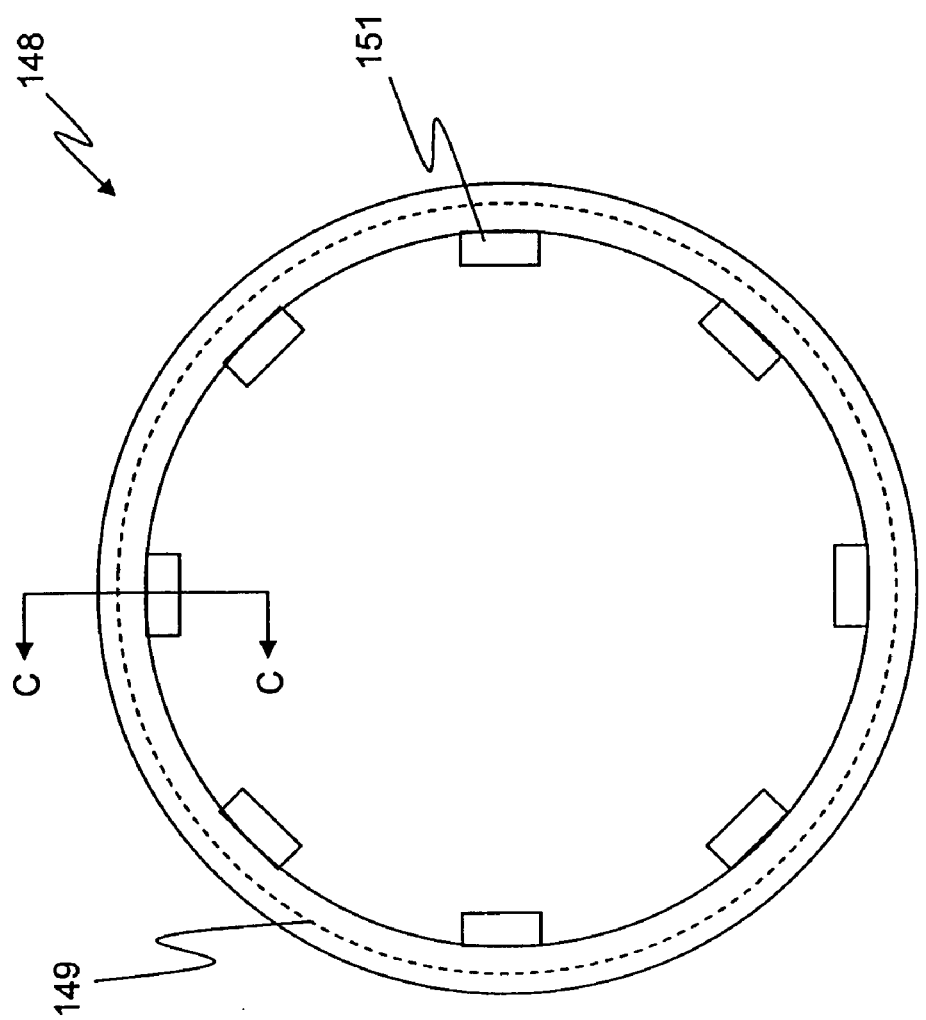
FIG. 9 is front view of a locking member of the thrust washer retainer of FIG. 3.

Referring to FIG. 4, thrust washer retainer 136 is shown and includes a first retainer portion 144, a second retainer portion 146 and a locking member 148. Referring to FIG. 5 and FIG. 6, first retainer portion 144 is shown and defines at least one first mating structure 150 and includes a first interface structure 152 having a first threaded portion 154. Referring to FIG. 7 and FIG. 8, second retainer portion 146 is shown and defines at least one second mating structure 156 and includes a second interface structure 158 having a second threaded portion 160. Referring to FIG. 9 and FIG. 10, locking member 148 is shown and defines an undercut portion 149 and includes at least one locking structure 151.

First retainer portion 144 is disposed relative to second retainer portion 146 such that first interface structure 152 is adjacent to second interface structure 158 wherein first threaded portion 154 and second threaded portion 160 threadingly interact with each other to associate first retainer portion 144 with second retainer portion 146. This interaction minimizes axial movement of first retainer portion 144 and second retainer portion 146 relative to each other. Moreover, first retainer portion 144 is disposed relative to second retainer portion 146 such that, first mating structure 150 is aligned with second mating structure 156. Locking member 148 is lockingly disposed relative to first retainer portion 144 and second retainer portion 146 such that the at least one locking structure 151 is disposed within the at least one first mating structure 150 and the at least one second mating structure 156. This may be accomplished by sliding locking, member 148 over first retainer portion 144 and second retainer portion 146 such that locking structure 151 is disposed within first mating structure 150 and second mating structure 156. Because locking structure 151 is disposed within first mating structure 150 and second mating structure 156, first retainer portion 144 and second retainer portion 146 are prevented from rotating relative to each other, thus preventing first retainer portion 144 and second retainer portion 146 from becoming unthreaded from each other.

It should be appreciated that although locking member 148 is shown and described as one member having multiple locking structures 151, locking member 148 may be any locking member device suitable to the desired end purpose, such as multiple locking structures keyed to lockingly engage first mating structure 150 and second mating structure 156. Moreover, it should be appreciated that although first mating structure 150 and second mating structure 156 are shown as cavities (female) and locking structure 151 is shown as a protruding member (male), it should be considered within the scope of the invention that first mating structure 150 and second mating structure 156 may be protruding members (male) and locking structure 151 may be a cavity (female) for containing first mating structure 150 and second mating structure 156. It should be appreciated that at least one of the first interface structure 152 and the second interface structure 158 is configured to securingly engage the other of the first interface structure 152 and the second interface structure 158. It should also be appreciated that first retainer portion 144 and second retainer portion 146 may be associated with each other using any device or method suitable to the desired end purpose, such as a bolt, clip and/or screw.

Figure 11:
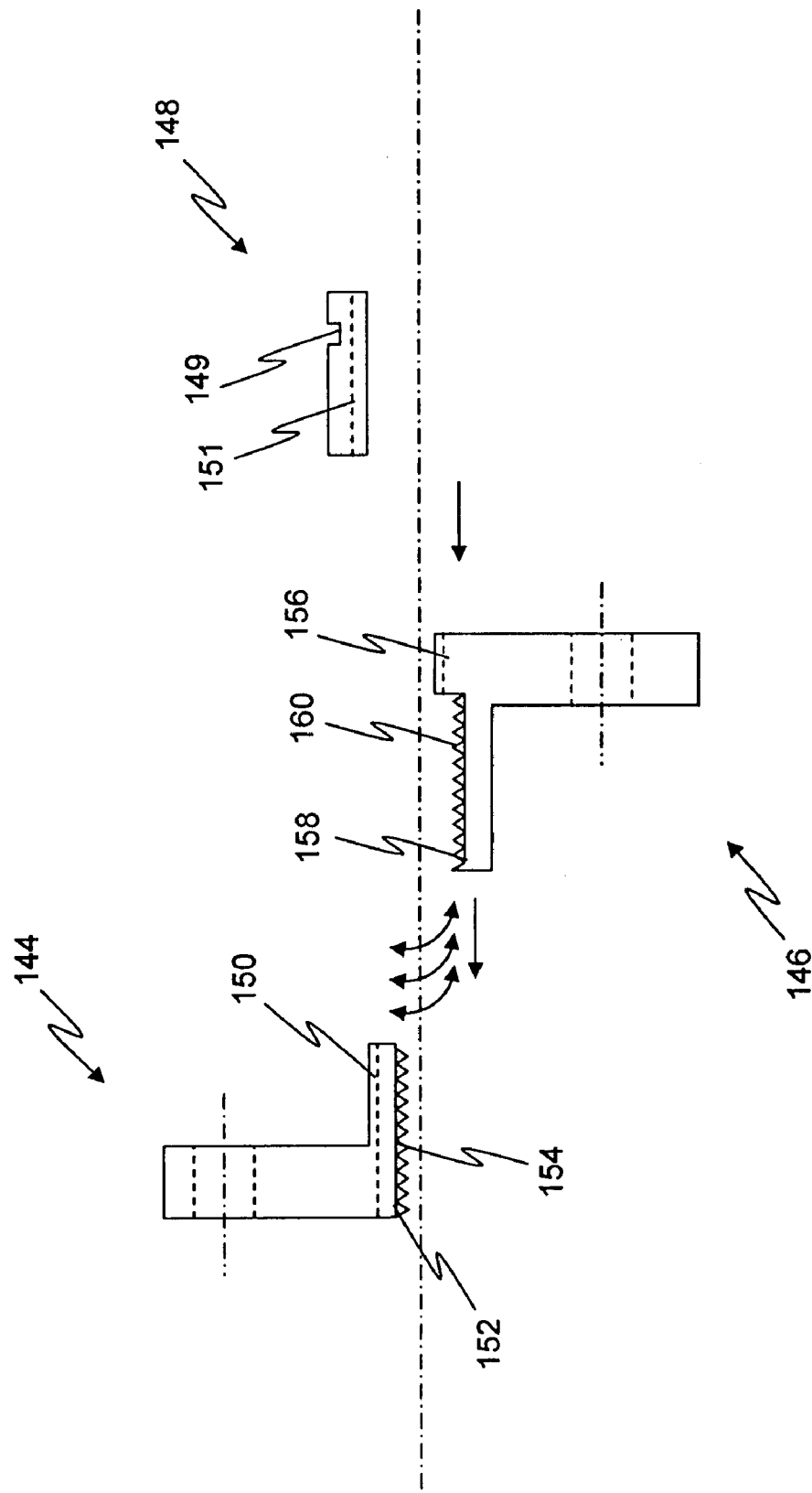
FIG. 11 is an exploded side sectional view of the thrust washer retainer of FIG. 3.

Referring to FIG. 11 and FIG. 12, thrust washer retainer 136 allows inboard thrust washer 132 to be removed from transmission 100 without completely disassembling transmission 100. This may be accomplished by removing sun pinion cover 102 to expose transmission opening 112 and thus, low-speed sun pinion 138. Low-speed sun pinion 138 is removed from hub assembly cavity 114 to expose thrust washer retainer 136 and plug 134. Locking member 148 is removed from thrust washer retainer 136 by sliding locking member 148 in an axial direction toward transmission opening 112 to remove locking structure 151 from first mating structure 150 and second mating structure 156. Inboard thrust washer 132 is exposed by disassociating second retainer portion 146 from first retainer portion 144. This may be accomplished by rotating second retainer portion 146 relative to first retainer portion 144 to disengage second threaded portion 160 from first threaded portion 154.

Once second retainer portion 146 is disassociated from first retainer portion 144, second retainer portion 144 is removed from hub assembly cavity 114, exposing inboard thrust washer 132. Inboard thrust washer 132 may then be replaced and second retainer portion 146 may then be re-associated with first retainer portion 144 by disposing second retainer portion 146 adjacent first retainer portion 144 and rotating second retainer portion 146 to cause second threaded portion 160 and first threaded portion 160 to threadingly engage each other. Second retainer portion 146 should be snugly associated with first retainer portion 144 such that first mating structure 150 is aligned with second mating structure 156. Locking member 148 is then re-positioned over first retainer portion 144 and second retainer portion 146 such that locking structure 151 is contained within first mating structure 150 and second mating structure 156. Low-speed sun pinion 138 is re-associated with transmission 100 and sun pinion cover 102 is mounted to hub assembly 110.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A removable thrust washer retainer for an off-highway vehicle having an electric propulsion system which includes a plurality of motorized wheels, a traction motor for delivering power to a respective wheel, a transmission in the wheel for transmitting power from the motor to the wheel, wherein the transmission comprises a central drive shaft, a planetary gear train at the end of the central drive shaft, and a thrust washer enabling relative rotation of the central drive shaft and the wheel, and a cover over an opening in an outer end of the wheel for access to the thrust washer, the removable thrust washer retainer comprising:

a first thrust washer retainer portion, wherein said first thrust washer retainer portion is of generally annular configuration and defines a bearing surface engageable with a thrust washer at the end of a drive shaft of an electric propulsion system, at least one first mating structure and a first interface structure, wherein said first thrust washer retainer portion is accessible at said outer end of a wheel via an opening therein;

a second thrust washer retainer portion, wherein said second thrust washer retainer portion is of generally annular configuration and defines a second mating structure surrounding and engageable with said first mating structure of said first thrust washer retainer portion for detachably connecting said first thrust washer retainer portion and second thrust washer retainer portions against relative axial movement when connected, wherein said second thrust washer retainer portion is secured in the wheel against removal without removal of the wheel from the vehicle, and further includes a second interface structure; and a locking member of generally annular configuration accessible via the opening at said outer end of the wheel and surrounding said first mating structure and said second mating structure of said first thrust washer retainer portion and said second thrust washer retainer portion and having at least one locking structure engageable with said first interface structure and said second interface structure of said first thrust washer retainer portion and said second thrust washer retainer portion for selectively securing said first thrust washer retainer portion and said second thrust washer retainer portion against relative annular motion, whereby with the cover removed said locking member may be detached from said first thrust washer retainer portion and said second thrust washer retainer portion and said first thrust washer retainer portion and said second thrust washer retainer portion may be detached from each other so as to enable removal and replacement of said first thrust washer retainer portion from said opening in the wheel.

2. The thrust washer retainer of claim 1, wherein said first interface structure includes a first threaded portion and said second interface structure includes a second threaded portion wherein said first threaded portion and said second threaded portion are sized and shaped to threadingly engage each other.

3. The thrust washer retainer of claim 1, wherein at least one of said first interface structure and said interface structure is configured to securingly engage the other of said first interface structure and said second interface structure.

4. The thrust washer retainer of claim 1, wherein said first mating structure and said second mating structure are securingly associated via at least one of a bolt, a clip, a snap, a clamp and an adhesive.

5. The thrust washer retainer of claim 1, wherein said first retainer portion, said second retainer portion and said locking member are at least partially constructed from at least one of a metallic material, a ceramic material and a composite material.

6. A thrust washer retainer comprising:
- a first retainer portion, wherein said first retainer portion defines at least one first mating structure and includes a first interface structure;
- a second retainer portion, wherein said second retainer portion defines at least one second mating structure and includes a second interface structure said first interface structure and said second interface structure being configured to threadingly engage each other, wherein said second retainer portion is disposed relative to said first retainer portion such that said first mating structure is associated with said second mating structure; and
- a locking member having at least one locking structure, wherein said locking structure is associated with at least a portion of said first mating structure and said second mating structure such that said first retainer portion is non-movable relative to said second retainer portions,
- wherein the thrust washer retainer is for use in an off-highway vehicle having an electric propulsion system which includes a plurality of motorized wheels, a traction motor for delivering power to a respective wheel, a transmission in the wheel for transmitting power from the motor to the wheel, wherein the transmission comprises a central drive shaft, a planetary gear train at the end of the central drive shaft, and the thrust washer enabling relative rotation of the central drive shaft and the wheel, and a cover over an opening in an outer end of the wheel for access to the thrust washer.

* * * * *